H. G. GUNN.
APPARATUS FOR FILLING HONEYCOMBS.
APPLICATION FILED MAY 23, 1917.
1,288,874.
Patented Dec. 24, 1918.
2 SHEETS—SHEET 1.
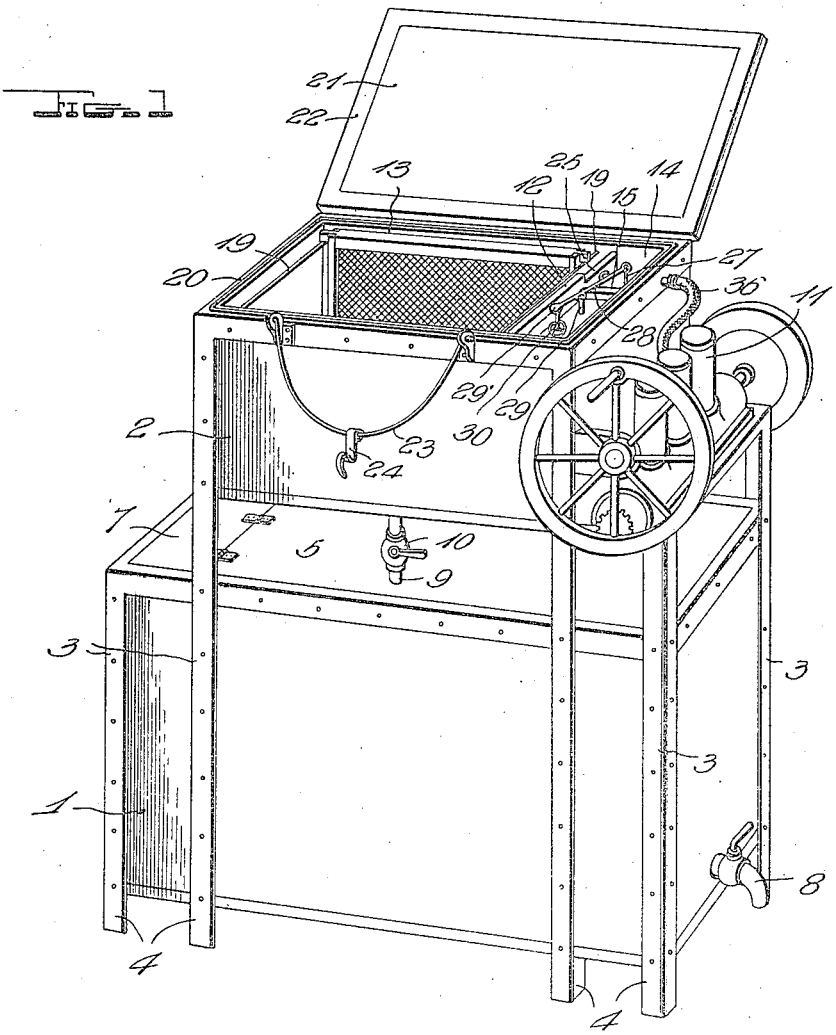
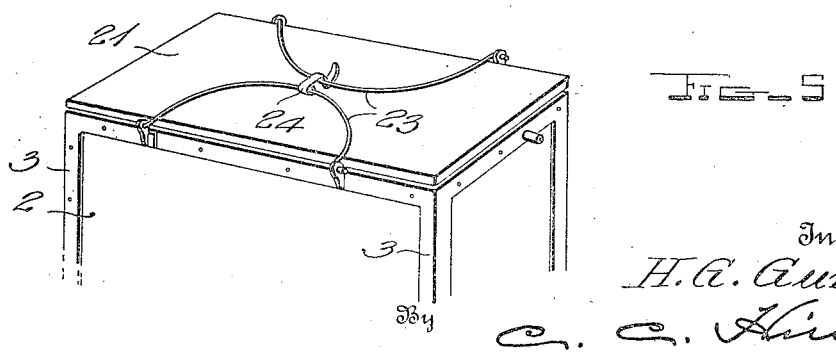
Inventor
H. G. Gunn
By C. C. Hines.
Attorney

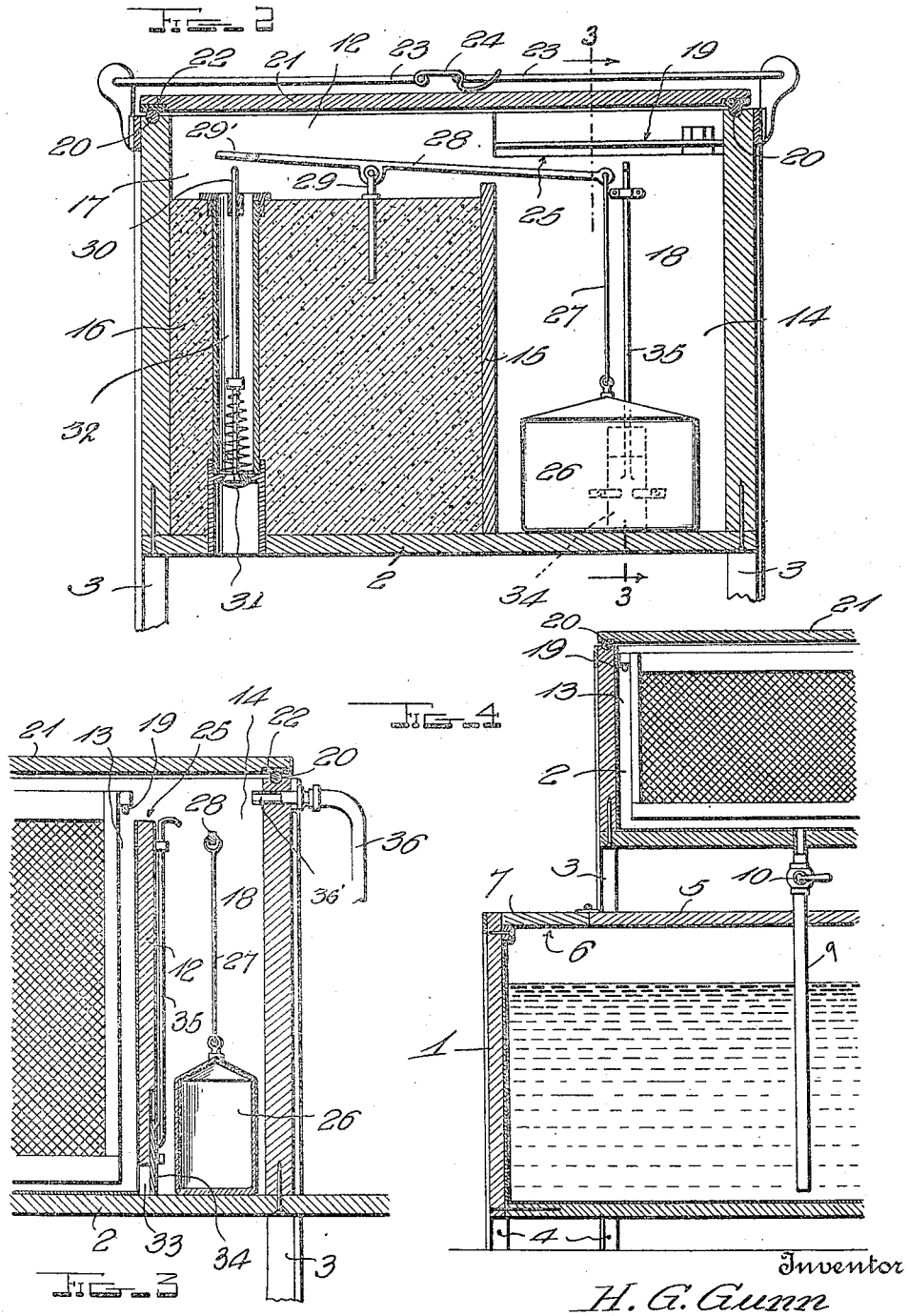

UNITED STATES PATENT OFFICE.

HENRY G. GUNN, OF HAMILTON, NORTH DAKOTA.

APPARATUS FOR FILLING HONEYCOMBS.

1,288,874.  Specification of Letters Patent.  Patented Dec. 24, 1918.

Application filed May 23, 1917. Serial No. 170,374.

*To all whom it may concern:*

Be it known that I, HENRY G. GUNN, a subject of the King of England, residing at Hamilton, in the county of Pembina and State of North Dakota, have invented new and useful Improvements in Apparatus for Filling Honeycombs, of which the following is a specification.

This invention relates to a machine or apparatus designed for the use of apiarists for the purpose of filling empty honey combs with a food substance, to facilitate and expedite the process of "feeding", when preparing colonies of bees for winter, or at other times when it is found expedient to supply them with stores of food in the form of sugar syrup. Up to the present time, so far as I am aware, the only method known to bee keepers, for the accomplishment of this very necessary operation, has been that of pouring the syrup into some kind of a receptacle, especially designed for the purpose, usually placed within the hive, and allowing the bees to sip out and store it in the combs, after their regular manner of gathering and storing honey. This method is open to many objections. In the first place, it is slow and tedious, especially if the weather is cool; so that it becomes a formidable task in apiaries of any considerable size. In the second place, it is cumbersome and expensive, it being necessary, in large apiaries, to keep on hand hundreds of "feeders", which take up storage room, run into considerable expense, and are continually drying out. And, in the third place, it is unsanitary and untidy, and is a constant incentive to "robbing" and other troubles in the apiary.

The object of the present invention is to provide an apparatus whereby the operation of filling honey combs with sugar syrup or similar food material may be readily and conveniently accomplished, and whereby a large number of combs may be filled within a minimum amount of time.

With these and other objects in view, the invention consists of the features of construction, combination and arrangement of parts, hereinafter fully described and claimed, reference being had to the accompanying drawings, in which:—

Figure 1 is a perspective view of a comb filling apparatus embodying my invention, showing the cover of the impregnating box removed and turned back.

Fig. 2 is a vertical transverse section through one end of the impregnating box on the line of the relief valve and its controlling means.

Fig. 3 is a vertical longitudinal section through one end of the apparatus on line 3—3 of Fig. 2.

Fig. 4 is a vertical longitudinal section through the opposite end of the apparatus taken on the line of the syrup feed pipe.

Fig. 5 is a perspective view of the impregnating box, showing the cover thereof closed and clamped in closed position.

In carrying my invention into practice I provide a filling apparatus of suitable construction, as shown in the present instance consisting in the main of a pair of superposed receptacles 1 and 2, the lower receptacle serving as a storage tank to contain the sugar syrup to be supplied to the combs, while the upper receptacle 2 forms an impregnating box in which the empty combs are placed to be impregnated or filled with sugar syrup. These receptacles 1 and 2 are connected and supported in superposed relation by a frame work 3, consisting of vertical and horizontal bars of angle iron or other suitable material, the vertical bars being preferably extended below the bottom of the receptacle 1 to form supporting feet 4 to hold the apparatus as a whole at a suitable elevation above the ground or floor line.

The body of each box or receptacle may be made of any suitable material, but is preferably composed of wood having an internal water-proof lining of sheet metal, such as zinc, of a character which will not contaminate the sugar syrup and which may be readily cleansed whenever desired. The receptacle 2 is of special construction, as hereinafter described, to provide a vacuum chamber in which the combs are placed for the purpose of exhausting the air from the cells thereof prior to impregnation, as well as to provide means for effecting the exhaust of the air and controlling the flow of the syrup, etc.

The receptacle 1 may be of any suitable size and is provided with a fixed top 5 having at one end an opening 6 for the introduction of the syrup and to enable access to be obtained to the interior of said receptacle for washing or cleaning it out when desired. This opening 6 may be closed by a suitable lid or cover 7. A valve or faucet 8 is provided at a suitable point to enable the syrup to be drawn off from the receptacle when desired.

The receptacle 2 is disposed at a suitable elevation above the top of the receptacle 1, and, as shown in the present instance, is of less length than the receptacle 1 and in communication therewith through a vertically disposed syrup feed pipe 9 extending from the bottom of the receptacle 2 to a point adjacent to the bottom of the receptacle 1, and provided at a point between said receptacles with a controlling and cut off valve 10. At one end the bottom of the receptacle 2 is preferably extended to form a ledge or shelf to support a suitable type of vacuum pump 11, but the shelf may be constructed or formed in any other desired manner. The pump 11 may be of the electric, internal combustion or any other suitable type adapted for the purpose.

The receptacle 2 is divided by a vertical transverse partition 12 into a main compartment 13 and an end compartment 14, the main compartment 13 serving as a vacuum chamber and filling or impregnating chamber in which the combs are placed for treatment. The compartment 14 is sub-divided by a cross partition 15 into separate divisions, one of which is provided with a suitable filling 16 of cement or other material, extending from the bottom of the receptacle to a point adjacent to the top thereof, and terminating sufficiently below the top of the receptacle and the upper edge of the partition 12 to provide a shallow chamber 17, while the other division of said compartment 14 extends the full height or depth of the receptacle 2 to form a well or controlling chamber 18, for a purpose hereinafter described.

The vacuum or impregnating chamber 13 is of a suitable size to contain ten or more combs of the standard Langstroth size at each operation, the combs being disposed in spaced relation to each other and to the walls of said chambers and hung or suspended from cross wires or other supports 19 fixed at their ends in the side walls of the chamber. These wires or other supports are disposed below the top of the receptacle and immediately below a bead or rim 20 bounding the chambers or compartments of said receptacle, which is raised at the top to receive a cover 21, provided on its lower surface with a sealing facing 22 of cork, rubber or other suitable material, adapted for sealing engagement with the bead 20 to close the top of the casing in an air and liquid tight manner. Bail-shaped clamps 23 are pivotally mounted at the opposite sides of the receptacle and are adapted to be swung downwardly and inwardly over upon the cover 21 and to be connected and held in position to clamp said cover in position by means of a suitable fastening 24. When the cover is thus clamped in position, the bead 20 will be embedded in the sealing face or gasket 22, thus forming an absolute fluid tight connection so that a vacuum of the desired degree may be produced within the vacuum and impregnating chamber.

The pipe 9, as stated, is for the purpose of conducting the syrup from the receptacle 1 to the vacuum chamber 13 when the air has been exhausted from said chamber, and mechanism is provided for automatically stopping the feed of syrup when the combs are completely submerged. To this end, the wall or partition 12 is provided with a cut out portion forming an overflow outlet or passage 25 from the upper portion of the chamber 13 to the well 18, through which outlet or passage the syrup will flow into the well when the chamber 13 is filled to the required depth to submerge the combs in the syrup. Arranged for movement within the well 18 is a valve operating device or float 26, made of any suitable material, which float is coupled by a link or suitable connection 27 with one arm of a valve actuating lever 28 fulcrumed to a suitable support 29 embedded in the cement filling 16, whereby said lever is mounted for pivotal movement in a vertical plane. The lever 28 extends longitudinally over the partition 15, chamber 17 and well 18 and has its opposite arm provided with a contact member 29' which engages the stem 30 of a spring closed check valve 31 arranged within a relief pipe or tube 32. This pipe or tube 32 extends downwardly through the filling 16 and bottom of the receptacle 2 and is in open communication at its lower end with the atmosphere. The valve 31 is adapted when closed to seal the tube or pipe against the admission of air to the vacuum chamber, and to be opened by an actuating motion of the lever 28 to allow air to enter to break the vacuum when the vacuum chamber is fully filled with syrup and the combs properly submerged. An opening or port 33 is provided in the partition 12 to afford communication between the chamber 13 and well 18, whereby the syrup contained in the well may be allowed to pass back into the vacuum chamber for return through the pipe 9 to the receptacle 1, at the end of the impregnating action. This opening or port is controlled by a vertically movable valve or gate 34, which is adjustable by means of a hand rod 35, whereby said gate or valve may be manually opened and closed when the hand rod is exposed for operation.

It will be understood that the primary object of the apparatus is to provide means whereby the air contained within the cells of an empty comb may be exhausted, for the free flow of syrup thereto to take its place, thereby enabling the comb to be readily and freely filled in an effective manner. Ordinary submergence of the empty comb in the liquid is not sufficient for the reason that a dry, empty honey comb can not be filled with any facility or rapidity by submergence on account of the resistance of the wax to the passage of liquid and the resistance of the dead air contained in the cells, preventing the admission of liquid except sporadically through the comb. By, however, exhausting the dead air from the cells of the comb, the resistance to the entrance of the liquid will be removed, thus allowing the comb to be successfully and uniformly filled. By means of the present apparatus, and the process employed in the method of treatment, the air may be exhausted from the cells of a plurality of honey combs at a time, and upon the combs then being submerged in the syrup a quick filling of the cells of the combs with the syrup will ensue.

The pump is connected by a flexible suction tube 36 with an air exhaust tube or pipe 36' extending transversely through the outer wall of the well 18 into the well chamber, said tube being arranged at a proper level to obviate any liability of any of the syrup being drawn into the pump. In the operation of the device, the honey combs to be filled are placed in position in the vacuum chamber, the cover 21 applied and clamped to seal said chamber and, the valve 10 being closed, the pump 11 is set into action. By the action of the pump the air will be exhausted from the impregnating box 13, and when a certain degree of vacuum is formed the valve 10 is opened to allow the syrup to flow by external air pressure through the pipe 9 from the receptacle 1 to the chamber 13. The syrup will continue to flow into the chamber 13 until the level at which the combs are fully submerged is reached, at which time the syrup will flow through the outlet 25 into the well 18. As the syrup flows into the well it raises the float 26, whereby the lever 28 will be operated to open the relief valve 31, thus allowing air to enter the impregnating box, whereupon the vacuum will be broken and the flow of syrup to the vacuum chamber will cease. As the air has been by the action of the pump exhausted from the cells of the combs, it will be obvious that the syrup will rush into the cells to take the place of the exhausted air, whereby the combs will be uniformly and expeditiously filled. In practice, the pump may be kept in operation after the vacuum is broken, to continue to maintain a sufficient degree of vacuum to obviate any possibility of the syrup flowing back into the receptacle 1 until the combs are fully impregnated. At the end of the operation, the gate or valve 34 is opened to allow the syrup contained in the well to flow back into the vacuum chamber, from which all of the syrup will recede back into the receptacle 1, after which the valve 10 is closed, thus placing the machine in condition for a repetition of the above described operation in the filling of another set of combs.

By the use of my filling apparatus all the objections to the ordinary practice of filling combs for feeding are avoided and the operation of filling the combs with syrup may be carried out indoors in a simple, rapid, economical and cleanly manner, the device enabling a single individual or operator, to fill a very large number of combs within a working day's period, so as to prepare hundreds of colonies of bees for winter without the untidy and laborious operations ordinarily necessary. It will, of course, be understood that the combs may be filled and laid aside for convenient use and may then be placed in the hive by the bee keeper at his convenience or whenever necessary, thus allowing a large number of combs to be prepared in an easy and convenient manner for future use.

While I have disclosed, for purposes of illustration, one form of device for carrying my invention into practical use, it is to be understood that the structure may be varied or modified as occasion may require, or as may be deemed most expedient for service or use under different conditions, and that therefore the invention is not restricted, except as particularly specified in the appended claims, to any particular construction or organization of parts.

Having described my invention, I claim:

1. An apparatus for filling honey combs with syrup or the like, comprising a vacuum chamber to contain the combs, means for pendently supporting a series of honey combs therein in spaced relation to each other, means for producing a vacuum in said vacuum chamber, means for admitting the liquid at the bottom of the chamber for upflow thereinto until the combs are submerged, and means for cutting off the flow of liquid when the combs are submerged.

2. An apparatus for filling honey combs with syrup or the like, embodying a vacuum chamber, means therein for supporting one or more combs, means for exhausting the air from the chamber and cells of the combs, means for admitting syrup to said chamber after the formation of a vacuum therein, and means for automatically cutting off the admission of syrup when the chamber is filled to a predetermined extent and simultaneously breaking the vacuum.

3. An apparatus for filling honey combs with syrup or the like, comprising a vacuum chamber, means for supporting a series of combs therein in an edgewise vertical position and in spaced relation to each other, means for exhausting air from the vacuum chamber, means for admitting the liquid at the bottom of the chamber for upflow therein between the combs until said combs are submerged, and means for cutting off the flow of liquid when the combs are submerged.

4. An apparatus for filling honey combs with syrup or the like, comprising a vacuum chamber, means for exhausting air from said chamber, means for admitting syrup to the chamber, a valved controlled air inlet communicating with the vacuum chamber, and means for admitting air through said inlet when the vacuum chamber is supplied with syrup to a predetermined extent.

5. An apparatus for filling honey combs with syrup or the like, comprising a vacuum chamber, means for exhausting air therefrom, a syrup reservoir below the vacuum chamber, and an up-take valved conductor between said reservoir and chamber.

6. An apparatus for filling honey combs with syrup or the like, comprising a vacuum chamber, means for exhausting air therefrom, means in said chamber for supporting a plurality of honey combs edgewise in a vertical position and in spaced relation to each other, means for admitting the liquid at the bottom of the chamber for upflow therein between the combs until said combs are submerged, an outlet communicating with the chamber at or near the level at which the combs are submerged, and means governed by the discharge of liquid through said outlet for breaking the vacuum and cutting off the flow of liquid to the chamber.

7. An apparatus for filling honey combs with syrup or the like, comprising a vacuum chamber, means for exhausting air from said chamber, means for admitting syrup to the chamber after the formation of a vacuum therein, a well in communication through an overflow outlet with the vacuum chamber, and means controlled by the passage of syrup into the well for cutting off the feed of syrup to the vacuum chamber.

8. An apparatus for filling honey combs with syrup, comprising a vacuum chamber, means for exhausting air from said chamber, means for supplying syrup to the chamber after the formation of a vacuum therein, a well in communication through an overflow passage with the vacuum chamber, a valved controlled device for admitting air to the vacuum chamber, and a float operating in the well for actuating said valved controlled device.

9. An apparatus for filling honey combs with syrup or the like, comprising a syrup reservoir, a vacuum chamber, a valved syrup supply pipe connecting the reservoir and chamber, means within the vacuum chamber for storing one or more honey combs therein, a cover for hermetically sealing the vacuum chamber, means for exhausting air from the vacuum chamber and the cells of the combs contained therein, and means for automatically governing the flow of the syrup to the vacuum chamber.

10. An apparatus for filling honey combs with syrup or the like, comprising a syrup reservoir, a vacuum chamber, a syrup supply pipe connecting the reservoir and chamber and having a controlling valve therein, means within the vacuum chamber for supporting one or more honey combs, means for sealing said chamber, means for exhausting air from the vacuum chamber, a well supplied with syrup from the vacuum chamber after said chamber has been filled to a predetermined extent, an air inlet device for admitting air to the vacuum chamber, and a float operating in the well and controlling said device.

11. An apparatus for filling honey combs with syrup or the like, comprising a vacuum chamber having an outlet at a determined level, means for supporting a plurality of honey combs in said chamber in spaced relation to each other, means for exhausting air from said chamber, a syrup reservoir, a valved conductor connecting said reservoir with the vacuum chamber, an air inlet communicating with the vacuum chamber, and means governed by the discharge of syrup from the vacuum chamber through said outlet for admitting air thereto through said inlet.

12. An apparatus for filling honey combs with syrup or the like, comprising a vacuum chamber, means for exhausting air from said chamber, means for admitting syrup to the chamber after the formation of a vacuum therein, a well in communication through an overflow outlet with the vacuum chamber, and means controlled by the flow of syrup into the well for admitting air to the vacuum chamber to break the vacuum therein.

13. An apparatus for filling honey combs with syrup or the like, comprising a vacuum chamber, means arranged therein for pendently supporting a plurality of honey combs side by side and in spaced relation, means for exhausting air from the vacuum chamber and cells of the combs, and means for admitting liquid to the chamber to impregnate the cells of the combs therewith, and means for automatically cutting off the admission of liquid to the chamber when the combs are completely submerged.

In testimony whereof I affix my signature.

HENRY G. GUNN.

Copies of this patent may be obtained for five cents each, by addressing the "Commissioner of Patents, Washington, D. C."